US011455397B2

(12) United States Patent
Maletsky et al.

(10) Patent No.: US 11,455,397 B2
(45) Date of Patent: Sep. 27, 2022

(54) SECURE BOOT ASSIST FOR DEVICES, AND RELATED SYSTEMS, METHODS AND DEVICES

(71) Applicant: Microchip Technology Incorporated, Chandler, AZ (US)

(72) Inventors: Kerry Maletsky, Monument, CO (US); David Paul Arnold, Chandler, AZ (US); Nicolas Auguste Constant Schieli, Saint-Lambert (CA); Bryan Hunt, Colorado Springs, CO (US)

(73) Assignee: Microchip Technology Incorporated, Chandler, AZ (US)

( * ) Notice: Subject to any disclaimer, the term of this patent is extended or adjusted under 35 U.S.C. 154(b) by 256 days.

(21) Appl. No.: 16/364,391

(22) Filed: Mar. 26, 2019

(65) Prior Publication Data

US 2020/0151336 A1    May 14, 2020

Related U.S. Application Data

(60) Provisional application No. 62/760,636, filed on Nov. 13, 2018.

(51) Int. Cl.
*G06F 21/57* (2013.01)
*G06F 21/34* (2013.01)
*G06F 21/12* (2013.01)
*G06F 9/4401* (2018.01)

(52) U.S. Cl.
CPC ............ *G06F 21/575* (2013.01); *G06F 21/34* (2013.01); *G06F 21/572* (2013.01); *G06F 9/4401* (2013.01); *G06F 21/12* (2013.01); *G06F 2221/2149* (2013.01)

(58) Field of Classification Search
CPC .... G06F 9/4401; G06F 21/575; G06F 21/572; G06F 21/12; G06F 21/34; G06F 2221/2149
USPC ...................................... 713/1, 2; 726/22, 26
See application file for complete search history.

(56) References Cited

U.S. PATENT DOCUMENTS

| 7,421,688 B1 * | 9/2008 | Righi | H04L 67/34 709/202 |
| 2010/0082955 A1 * | 4/2010 | Chhabra | G06F 21/572 713/1 |
| 2014/0109076 A1 * | 4/2014 | Boone | H04L 67/2842 717/170 |

(Continued)

OTHER PUBLICATIONS

Outgoing—ISA/210—International Search Report dated Jan. 2, 2020 for WO Application No. PCT/US19/056376.

(Continued)

*Primary Examiner* — Ji H Bae
(74) *Attorney, Agent, or Firm* — TraskBritt

(57) ABSTRACT

Systems, methods, and devices of the disclosure relate, generally, to secure boot assist for devices. In one or more embodiments, a first device includes firmware that needs to be verified as secure as part of a secure boot process, and a second device assists the first device to secure the secure boot process. In some embodiments the second device verifies security of the firmware responsive to security data provided by the first device, or verifies security of a program provided by the first device, the program for verifying security of the firmware. In some embodiments the second device provides a program for verifying security of the firmware to the first device.

21 Claims, 7 Drawing Sheets

(56) References Cited

U.S. PATENT DOCUMENTS

| | | | |
|---|---|---|---|
| 2015/0169837 A1* | 6/2015 | Guthrie | G01N 27/26 204/406 |
| 2015/0317471 A1 | 11/2015 | Baentsch et al. | |
| 2017/0154184 A1* | 6/2017 | Shivanna | G06F 21/44 |
| 2018/0165455 A1* | 6/2018 | Liguori | G06F 9/4406 |
| 2019/0227783 A1* | 7/2019 | Chang | G06F 8/65 |

OTHER PUBLICATIONS

Outgoing Written Opinion of the ISA dated Jan. 2, 2020 for WO Application No. PCT/US19/056376.

\* cited by examiner

Computing System

SECURE BOOT ASSIST FOR DEVICES, AND RELATED SYSTEMS, METHODS AND DEVICES

CROSS-REFERENCE TO RELATED APPLICATION

This application claims priority to and the benefit of the filing date of U.S. Provisional Patent Application Ser. No. 62/760,636, filed Nov. 13, 2018, the disclosure of which is hereby incorporated herein in its entirety by this reference.

FIELD

The present disclosure relates, generally, to ensuring firmware to be executed at a target device is secure; and more specifically, some embodiments relate, generally, to using a secure device external to a target device to ensure that a program for verifying firmware at the target device is secure; and more specifically still, some embodiments relate, generally, to using a secure device external to a target device to control at least some of a secure boot process at the target device to ensure firmware to be executed at the target device is secure.

BACKGROUND

Sometimes the firmware that runs devices such as microcontroller units (MCUs) needs to be updated "in-field" (i.e., after the device has left the factory), for example, because a manufacturer releases a new version of firmware to correct bugs or add functionality. Many devices use Flash memory or other non-volatile memory to store firmware because Flash memory may be modified by firmware itself.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
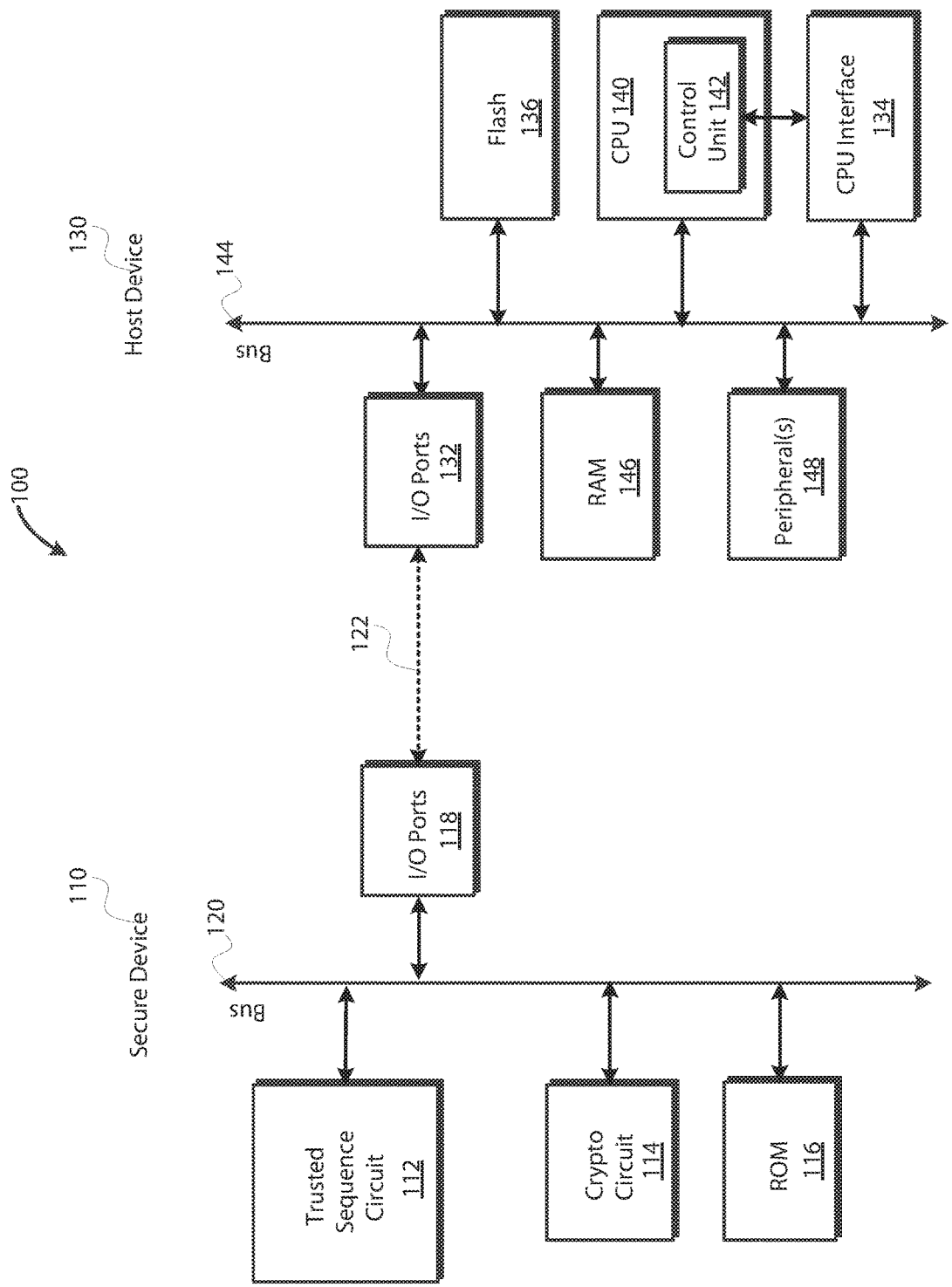
FIG. 1 is a simplified block diagram of a computing system in accordance with one or more embodiments of the disclosure.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments.

The following description may include examples to help enable one of ordinary skill in the art to practice the disclosed embodiments. The use of the terms "exemplary," "by example," "for example," "e.g.," and the like means that the related description is explanatory, and though the scope of the disclosure is intended to encompass the examples and legal equivalents, the use of such terms is not intended to limit the scope of an embodiment or this disclosure to the specified components, steps, features, functions, or the like.

Thus, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure. While code may be described herein as configured to enable a processor to perform certain functions or operations, description of a processor may be omitted in some cases because the inventors believed repetitive recitation of a processor may obscure details of disclosed embodiments. For example, sometimes code may be described as performing functions or operations, or configured to perform functions or operations, of the disclosed embodiments without specifically reciting that the functions or operations are performed by a processor executing the code.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used in the present disclosure, the terms "unit," "module" or "component" may refer to specific hardware implementations configured to perform the actions of the unit, module or component and/or software objects or software routines that may be stored on and/or executed by general purpose hardware (e.g., computer-readable media, processing devices, etc.) of a computing system. In some embodiments, the different units, components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

Boot code is often used in conjunction with in-field programming of a device. Boot code is a small piece (i.e., block) of code (as compared to application code) added to operating code (i.e., stored in Flash memory) that performs system functions, for example, when a device is turned on or when the device performs a reset. In a typical embedded system, particularly those that use Flash memory, boot code may perform tasks such as checking contents of Flash memory and system initialization tasks. Operating code may be responsible for moving new firmware to the embedded system and replacing old firmware, and may share some of the boot code functionality for checking a new firmware image or may rely on the boot code to check a new firmware image.

In order to tell a device to prepare to receive new firmware, hardware and/or software conditions are typically used. An example of a hardware condition may be pressing a button during reset of a device, and an example of a software condition may be detecting a lack of a valid application stored on a device during reset. If boot code an update condition is detected (typically a check performed boot code at system startup), then the installation application or boot code will attempt to connect to a host (e.g., a personal computer or programming tool, without limitation) and wait to receive an image of the new firmware. Once new firmware is moved to a device and replaces old firmware, the new code can then be executed by the device.

An issue that sometimes arises during in-field programming of a device is that new firmware may not be authentic, for example, it may be designed or provided by an unauthorized third-party, that is, not an authorized party such as the original manufacturer or a third-party authorized by the original manufacturer. So, the new firmware could be developed for a malicious use, e.g., to bypass security protections or illegally use critical functionality of a device, without limitation. Moreover, new firmware might be provided by an authorized party, but intended for a different device.

Another issue is that integrity of new firmware may be compromised. That is, data of new firmware may be modified, sometimes only slightly, from its original form. Modified firmware may still appear genuine, but the modifications may facilitate the same security issues noted above, namely, bypass of security protections or illegal use of critical functionality of a device. Moreover, compromised firmware may expose the firmware to the outside world and enable third-parties to copy and/or reverse engineer a manufacturer's firmware.

Yet another issue is that privacy may be compromised if an image of new firmware (the electronic copies of the firmware being distributed to devices) is exposed or accessible. Firmware could be decompiled or otherwise analyzed by a third-party while in transit to the target device, and proprietary information stored in the firmware or about the firmware could be captured.

Boot code is a critical part of maintaining security of firmware (i.e., authenticity, integrity, and/or privacy). Firmware security is sometimes verified by boot code in a sequence of operations commonly referred to as a "secure boot sequence." For example, in a typical secure boot sequence, boot code is the first code executed after the processor has been reset or powered up, the boot code then verifies the security of new firmware stored in program memory, and if the new firmware is verified, the boot code initiates loading and execution of the firmware.

Verifying firmware security typically involves authenticating a source of new application code and confirming integrity of the firmware. Digital signatures and/or the use of a message authentication code (MAC) unique to authorized parties are often used to authenticate a source of the firmware, for example, in a case of a digital signature by using a corresponding public key, or in a case of a MAC using a private key which was used to compute the MAC.

To confirm integrity, hash functions are often used when firmware is created to generate a digest (also sometimes called a "message digest"), which digest corresponds to created firmware. The hash functions used to create the digest are assumed to be the same as hash functions stored on the target devices when they were manufactured. This "first" digest may be encrypted, for example, using public-key cryptography techniques, to obtain a digital signature. This digital signature may be distributed with new firmware for in-field programming of devices. When a device receives the firmware and the first digital signature, it computes a second digest from the received firmware using locally stored hash function(s) that should be the same hash function(s) used to create the first digest. The receiver encrypts the second digest to obtain a second digital signature, and compares the second digital signature to the first digital signature to determine if the digital signatures match. If the firmware was modified, even slightly, then in theory (statistically, the probability of a collision—i.e., obtaining the same digest when using the same hashing function(s) with different firmware—is very small) the second digest will not match the first digest, and so the first digital signature will not match the second digital signature.

In some cases, boot code may use a public key corresponding to a private key used to create the first digital signature to decrypt the first digital signature and recover the first digest. A boot code may then create a second digest as described herein and compare the first digest and the second digest to determine if they match. MAC codes generated using private key cryptography techniques are sometimes used instead of, or in addition to, digital signatures. Notably, encryption also serves to implicitly verify a target device, i.e., to verify that it is genuine or an intended target device for firmware.

Verification that firmware is secure depends, at least in part, on establishing a "root of trust" that an initial program, such as a boot code, responsible for authentication, confirming integrity, and/or decryption, is itself, secure. A conventional technique for establishing an initial root of trust is to store boot code in a read-only-memory (ROM) of a target device and, for a secure boot process, either execute the boot code directly out of ROM, or copy the stored boot code into program memory and, as an initial step verify security of the copied boot code using the stored boot code. In either case, the ROM establishes an initial root of trust.

Secure boot capabilities are increasingly used in devices such as MCUs, but many existing devices do not have a boot ROM (i.e., ROM with a boot code stored thereon) to establish an initial root of trust and implement secure boot processes. Some devices, such as microprocessors (MPUs) implement a separate chip that sits between a processor and a memory, but such a technique is not viable for devices that have integrated code memory (i.e., same memory for operating code and boot code). Moreover, in the case of MCUs, changing a mask set for every MCU to include a boot ROM would be prohibitive and expensive in terms of cost and time.

So, the inventors of this disclosure appreciate a need for systems, methods and devices to assist target devices with secure boot processes. In some embodiments, such systems, methods and devices may establish a root of trust for implementing secure boot at target devices without boot ROMs or other hardware for establishing a root of trust. Moreover, the inventors of this disclosure appreciate a need for systems, methods, and devices for implementing secure boot processes in target devices that did not originally have secure boot capability or which need a stronger root of trust.

One or more embodiments of the disclosure relate, generally, to using a secure external device (e.g., a chip or microcontroller, without limitation) to validate boot code of a host device or provide boot code to a host device, so that the host device may execute a secure boot process. In one or more embodiments, a hardware output of the secure device may be operatively coupled to a hardware input of the host device, where the hardware input is a sole trigger for initiating a restricted mode of operation at the host device, and during the restricted mode the host device cannot independently execute local code (e.g., boot code or operating code, without limitation) and I/O ports are disabled except for an interface of the host device that has a group of I/O ports accessible only by, and controlled by, the secure external device. In one or more embodiments, connections for the hardware input and the interface may be physically isolated such that they are not externally accessible, for example, isolated by stacking and/or packaging the secure device together with the host device in a module such that connections are "hidden" between the secure device and the host device. In this manner a hardware input of a host device may be characterized as a "trust anchor" between a secure device and a host device.

FIG. 1 shows a simplified block diagram of a computing system 100 including secure device 110 and host device 130, in accordance with one or more embodiments of the disclosure. As non-limiting examples, computing system 100 may be, be part of, or include a microcontroller-type embedded system, a user-type computer, a file server, a computer server, a notebook computer, a tablet, a handheld device, a mobile device, a wireless earbud device or headphone device, a wired earbud or headphone device, an appliance, an automobile sub-system, or other computer systems for executing software. Computer, computing system, and server may be used interchangeably herein to indicate a system for practicing embodiments of the present disclosure. Computing system 100 may be configured for executing software programs containing computing instructions and may include one or more processors, memory, storage, user interface elements, one or more communication elements, and combinations thereof.

In one or more embodiments, host device 130 may include a central processing unit (CPU) 140, Flash 136 (i.e., Flash memory), CPU interface 134, RAM 146, input/output (I/O) ports 132, and peripherals 148. Flash 136 may be, for example, a program memory, and may be used to hold computing instructions, data structures, and other information for performing a wide variety of tasks including performing embodiments of the present disclosure—collectively referred to herein as "firmware." By way of example, firmware may include operating code and boot code. By way of further example, operating code may include code for an integrated embedded system, an operating system, an operating system loader, individually installed applications, and combinations thereof. Flash 136 is a non-limiting example of a non-volatile memory, it being understood that any non-volatile memory may be utilized in place of a Flash memory, including without limitation silicon nitride based charge trap devices and resistive memories, without exceeding the scope of this disclosure. RAM 146 may be used by CPU 140 in connection with performing calculations and other operations on data, including performing embodiments of the present disclosure.

CPU 140 may be configured to execute a wide variety of software such as operating systems and/or applications, including computing instructions for carrying out all or portions of embodiments of the present disclosure. CPU 140 may be a single or multi-core processor, and the core or cores may be any combination of specific purpose (e.g., DSP or ASIC, without limitation) and general purpose, configured and/or programmed to perform one or more of the functions described in this disclosure. In multi-core embodiments, the cores may operate independently and interdependently, including, without limitation, in a master slave arrangement. CPU 140 includes a control unit 142 that enables control of CPU 140 via CPU interface 134. By way of example, control unit 142 may be used to control CPU 140 to read and write to Flash 136 and RAM 146, to execute software (in whole or in part) stored at Flash 136 and/or RAM 146, to enable/disable I/O ports 132 of host device 130, to inspect an internal state or variables of CPU 140, and/or to set checkpoints, breakpoints and watch points. Such functions may be used for a variety of applications including without limitation testing/debugging computing system 100, updating computing system 100, protecting computing system 100 from unsecure code, and performing embodiments of the disclosure more generally. Any descriptor used herein such as "debug," "test," "verify," or "authenticate," is not intended to limit the general applicability of such circuitry.

In the example shown in FIG. 1, CPU 140 communicates with Flash 136, RAM 146, and I/O ports 132 over a number of busses labeled as bus 144 in FIG. 1. By way of example, bus 144 may include various buses that perform one or more functions of an address bus, a data bus, a peripheral bus, an event bus, a test bus, and a program bus, without limitation.

Control unit 142 is incorporated within CPU 140 and is directly accessible by CPU interface 134. CPU interface 134 communicates with I/O ports 132 over bus 144, and communicates with external devices, such as secure device 110 or a host computer via I/O ports 132. I/O ports 132 may include a variety of input and output ports implemented in hardware and/or software. In various embodiments, I/O ports 132 may include general purpose and special purpose I/O ports (GPIO & SPIO) for sending and receiving messages and signals, software ports for communicating with CPU interface 134, ports for receiving an asserted reset of secure device 110 from computing system 100, and other ports.

Peripherals 148 are configured to perform a variety of peripheral support functions in conjunction with, and/or independently of, CPU 140, including, for example, analog input and output, serial input/output, timers, and threshold detection circuits. Although shown as a distinct module in FIG. 1, one or more ports of I/O ports 132 may be implemented as a peripheral 148, for example, GPIO may be implemented as a peripheral 148. In one or more embodiments, peripherals 148 may include a peripheral configured to place and/or hold CPU 140 in a reset mode whereby CPU 140 is unable to start "normal" operation. For example, while in a reset mode CPU 140 does not load a memory address of a first instruction into a program counter, or, by way of another example, does not fetch a first instruction at a memory address of Flash 136. Such a peripheral may place and/or hold CPU 140 in a reset mode responsive to detecting power-on of computing system 100 and/or CPU 140, or detecting a condition that is treated like a power-on of computing system 100 such as a reset, for example, caused by assertion of a hardware input of I/O port 132.

In one or more embodiments, secure device 110 includes trusted sequence circuit 112, cryptography (crypto) circuit 114, ROM 116, and I/O ports 118. Trusted sequence circuit 112 may be configured, generally, to perform functions and other operations for verifying boot code and/or firmware in accordance with embodiments of this disclosure. Crypto circuitry 114 may be configured, generally, to perform asymmetric and/or cryptographic operations such as signature validation, MAC generation/validation, hash digest calculation encryption/decryption, or other operations using stored public, private, or secret keys, in accordance with embodiments of this disclosure. More specifically, crypto circuitry 114 may be configured to provide one or more public and/or private cryptography services to secure device 110 and/or computing system 100, more generally. In one or more embodiments, crypto circuitry 114 may be an analog circuit, an integrated circuit, software, or combinations thereof. ROM 116 may store data and code used in performing one or more embodiments of this disclosure, including, for example, a trusted copy of boot code.

In the example shown in FIG. 1, I/O ports 118 of secure device 110 and I/O ports 132 of host device 130 are operatively coupled through bi-directional connection 122 to facilitate transfer of messages and data between the two devices including to perform one or more embodiments of the disclosure.

Figure 2:
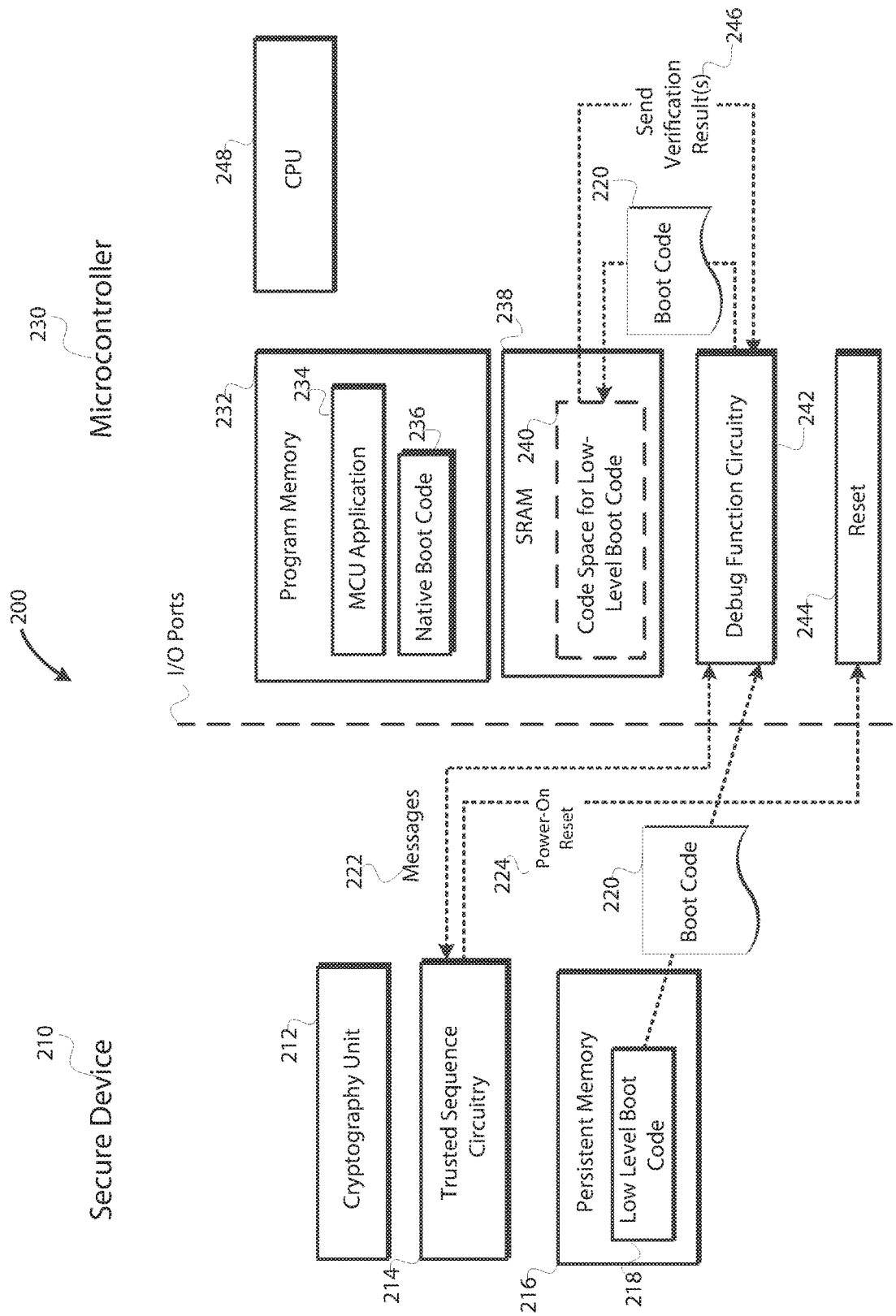
FIG. 2 is a simplified block diagram of a system for ensuring authenticity of an MCU application, in accordance with one or more embodiments of the disclosure.

FIG. 2 shows a simplified block diagram of an example system 200 for assisting with a secure boot process at a host device of a computing system, in accordance with one or more embodiments of the disclosure. In embodiments shown in FIG. 2, a program configured to verify MCU application 234 is secure is stored and provided to MCU 230 by secure device 210.

In one or more embodiments, MCU 230 includes a native boot code 236 stored in program memory 232. In one or more embodiments, native boot code 236 may not be configured to verify MCU application 234 is secure or may not be trusted to verify MCU application 234 is secure. Secure device 210 has a low-level boot code 218 boot code stored in persistent memory 216, and provides a copy 220 of low-level boot code 218 (i.e., an image of low-level boot code 218) to MCU 230. In one or more embodiments, low-level boot code 218 may be a program that, when executed by a processor, such as a CPU 248, is configured to verify firmware is secure, including verifying MCU application 234 is secure. Characterized another way, a low-level boot code 218 may be configured to perform at least some operations of a secure boot process, and in this example, operations that either native boot code 236 is not configured to perform, or which native boot code 236 is not trusted to perform. By way of example, low-level boot code 218 may be configured to verify native boot code 236 is secure, verify MCU application 234 is secure, or verify both native boot code 236 and MCU application 234 are secure.

In one or more embodiments, low-level boot code 218 may be configured to enable a processor to perform operations for verifying firmware is secure as well as include data related to performing those operations, including, without limitation, one or more of digests, hash functions, and public and/or private encryption keys.

In one or more embodiments, trusted sequence circuitry 214 may be configured, generally, to initiate a restricted mode of operation at MCU 230 (e.g., a reset mode, without limitation), to send copy 220 of low-level boot code 218 to MCU 230, and to initiate execution of copy 220 of low-level boot code 218 at MCU 230. In one embodiment, trusted sequence circuitry 214 may be configured to instruct CPU 248 to initiate execution of copy 220 of low-level boot code 218 upon entering a known state, and then de-asserting reset 244 thereby putting MCU 230 into such a known state, e.g., a normal operating mode such as normal boot up or reset. Upon MCU 230 entering the reset-initiated (i.e., by de-asserting reset 244) known state, copy 220 of low-level boot code 218 attempts to verify MCU application 234 and/or native boot code 236 without any more assistance from secure device 210.

In another embodiment, trusted sequence circuitry 214 may be configured to receive and process verification results 246 received from copy 220 of low-level boot code 218 executed at MCU 230 and transferred to trusted sequence circuitry 214 by debug function circuitry 242 as messages 222. Trusted sequence circuitry 214 may be configured to control exit of the initiated restricted mode of operation at MCU 230 responsive to verification result 246. In one or more embodiments, verification result 246 may indicate, generally, that verification of firmware was successful or failed. In one or more embodiments, verification result 246 may indicate whether native boot code 236 and/or MCU application 234 were verified as secure.

In some embodiments, if verification failed, verification result 246 may include some indication of the reason verification failed, such as an error code.

In one or more embodiments, trusted sequence circuitry 214 may be operatively coupled to reset 244 and debug function circuitry 242 of MCU 230, for example, by I/O ports 118 and I/O ports 132 of FIG. 1. Reset 244 may be a peripheral of MCU 230 such that, when a hardware input is asserted to reset 244, reset 244 is configured to trigger a hardware condition at MCU 230 that causes MCU 230 to enter a restricted mode, for example, a reset mode described in this disclosure. While MCU 230 is in the restricted mode, CPU 248 may not be able to perform one or more of: independently initiate execution of local software, receive or send data over some input and output ports, or respond to signals received at some input ports. CPU 248 may, however, be instructed to execute software via debug function circuitry 242, for example, by trusted sequence circuitry 214 using debug function circuitry 242.

While MCU 230 is in restricted mode, trusted sequence circuitry 214 may access SRAM 238 and, more specifically, code space 240, via debug function circuitry 242. Further, trusted sequence circuitry 214 may use debug function circuitry 242 to move copy 220 of low-level boot code 218 to code space 240, may instruct CPU 248 to execute code stored at code space 240 (i.e., copy 220 of low-level boot code 218), and receive verification result 246.

In one or more embodiments, trusted sequence circuitry 214 may be configured to use debug function circuitry 242 to instruct CPU 248 to execute native boot code 236 to perform some system initialization functions. More specifically, trusted sequence circuitry 214 may instruct CPU 248 to execute a limited number of functions of native boot code 236 related to system initialization. In one embodiment, trusted sequence circuitry 214 may transfer copy 220 of low-level boot code 218 to MCU 230 after all functions performed by software on MCU 230 (e.g., by native boot code 236, without limitation), if any, are complete so that integrity of copy 220 of low-level boot code 218 is not compromised.

In one or more embodiments, trusted sequence circuitry 214 may be configured to use debug function circuitry 242 to instruct CPU 248 to execute code (i.e., execute the copy 220 of low-level boot code 218) at address spaces corresponding to code space 240 in order to run copy 220 of low-level boot code 218, and verify MCU application 234.

In one or more embodiments, debug function circuitry 242 may be a hardware and/or software CPU interface and/or control unit for communicating with and controlling CPU 248, for example according to a Joint Test Action Group (JTAG) standard, or a special purpose hardware/software CPU interface and/or control unit for accomplishing the same. While various embodiments of this disclosure may show or describe debug function circuitry as "on-chip," this disclosure is not limited to an on-chip implementation, for example, one of ordinary skill in the art would understand that in-circuit techniques where a CPU is emulated off-chip may also be used and disclosed embodiments are applicable thereto.

In the example system 200 shown in FIG. 2, secure device 210 includes cryptography unit 212 for encrypting and decrypting messages 222 between secure device 210 and MCU 230. Encryption and decryption of messages 222 between a secure device 210 and a MCU 230 is not necessarily required, and so in some embodiments of example system 200 it is specifically contemplated that cryptography unit 212 may be omitted.

Figure 3:
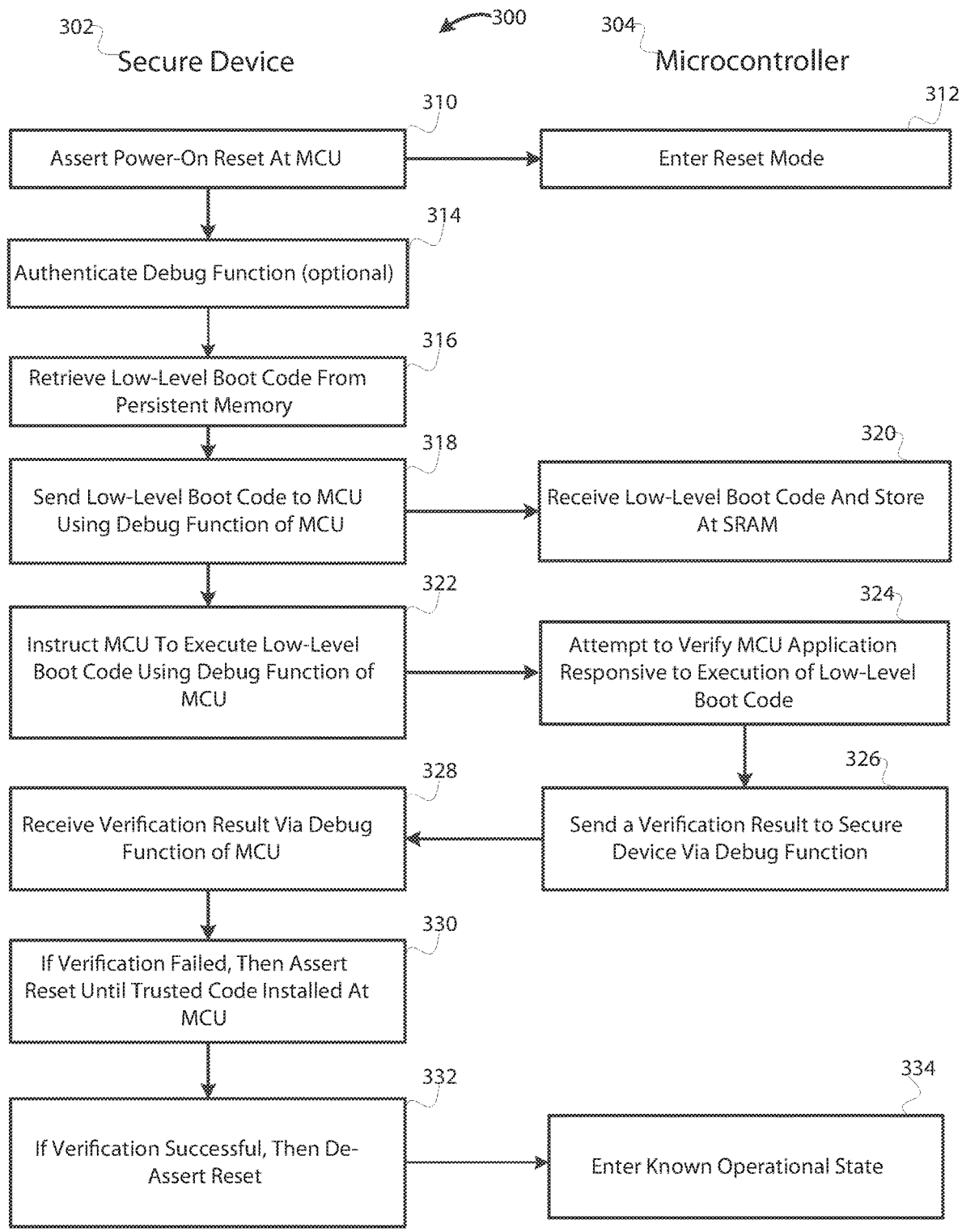
FIG. 3 is an example process for ensuing authenticity of an MCU application, in accordance with one or more embodiments of the disclosure.

FIG. 3 shows a process 300 for secure boot assist where a secure device 302 provides a low-level boot code to a host device represented by MCU 304, the low-level boot code configured to verify if firmware of MCU 304 host device is secure, in accordance with one or more embodiments of the disclosure. In the example contemplated by FIG. 3, an MCU application has already been received at MCU 304 and loaded into program memory, so while steps for connecting to a source and downloading an MCU application are not described with reference to FIG. 3, the incorporation of such steps into disclosed embodiments is specifically contemplated.

In operation 310, secure device 302 asserts and holds a reset at MCU 304. In operation 312, MCU 304 enters a reset mode responsive to secure device 302 asserting reset, and while the reset is asserted, in operation 312 MCU 304 is held in the reset mode and prevented from running any software on its own. In optional operation 314, a debug function (e.g., debug function circuitry 242, without limitation) of MCU 304 is authenticated, for example, using a digital signature generated using public key cryptology techniques. In one or more embodiments, authenticating the debug function may serve to confirm that the debug function has not been modified or that the secure device 302 has not been coupled to an illegitimate MCU. In embodiments where the debug function is primarily hardware and/or software stored in non-volatile memory, and the secure device 302 is not separable from the MCU 304, a step of authenticating a debug function may be omitted.

In operation 316, low-level boot code is retrieved from persistent memory of secure device 302. In operation 318, the retrieved low-level boot code (or a copy thereof) is sent to MCU 304 using a debug function of MCU 304. In operation 320, MCU 304 receives the sent low-level boot code, and low-level boot code is stored in SRAM. In operation 322, secure device 302 uses the debug function of MCU 304 to instruct MCU 304 to execute the low-level boot code stored in SRAM. In operation 324, attempted verification of at least part of MCU application 234 is performed by the low-level boot code, and in operation 326, a verification result is sent to secure device 302 via the debug function of MCU 304. In operation 328, secure device 302 receives the verification result via the debug function of MCU 304. If verification failed, then in operation 330 secure device 302 continues to assert the reset until detecting that trusted code has been installed at MCU 304. In one embodiment, secure device 302 may repeatedly restart MCU 304 until the low-level boot code detects that the MCU application is secure (e.g., the low-level boot code sends secure device 302 verification results indicating that the operating code is secure). If verification succeeded, then in operation 332, secure device 302 stops asserting the reset, and in operation 334, MCU 304 enters a known operational state from which it may execute the at least partially verified MCU application of operation 324.

In one or more embodiments, a low level boot code from a secure device may be configured to attempt to verify an MCU application, a native boot code, or both. In embodiments where a low-level boot code attempts to verify that a native boot code is secure, if a native boot code is verified, then the verified native boot code may be executed to verify other firmware is secure, including an MCU application.

Depending on an implementation, a new MCU application may overwrite native boot code at an MCU, or not (i.e., the native boot code may remain). In either case, in one or more embodiments, when a low-level boot code loaded from a trusted device attempts to verify that an MCU application code is secure it may be configured to verify both the MCU application code and the native boot code, together or separately. For example, low-level boot code 218 may use MCU application 234 and native boot code 236 (FIG. 2) to create a digital signature for verifying security.

One or more embodiments relate, generally, to systems and methods for secure boot assist where a native program generates security data for firmware, and circuitry at a secure device compares the security data to trusted security data that is stored at the secure device to determine if the firmware is secure and can be trusted.

Figure 4:
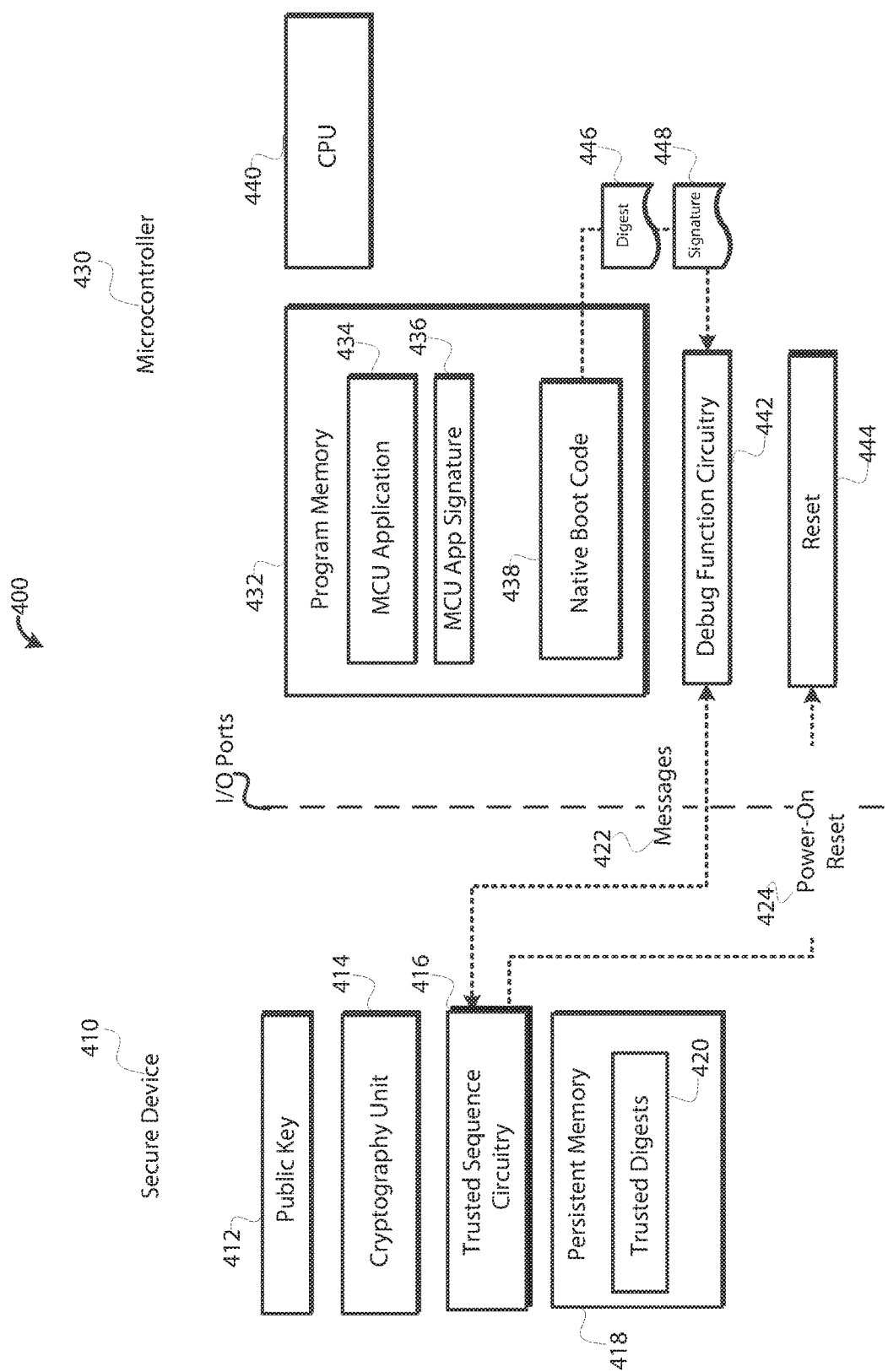
FIG. 4 is a simplified block diagram of a system for ensuring authenticity of an MCU application, in accordance with one or more embodiments of the disclosure.

FIG. 4 shows a simplified block diagram of an example system 400 for assisting with a secure boot process at a host device of a computing system, implemented here as MCU 430, in accordance with one or more embodiments of the disclosure. In embodiments shown in FIG. 4, MCU 430 includes native boot code 438 stored at program memory 432, and native boot code 438 is configured to generate security data based, at least in part, on MCU application 434. Security data may include, for example, digital signatures generated using public/private key encryption techniques, digests generated using hashing functions, and MAC codes. Notably, in embodiments shown in FIG. 4, native boot code 438 is not configured to, or such functionality is not trusted to, confirm validity of security data and/or render a final decision that MCU application 434 is secure. More specifically, in one or more embodiments, native boot code 438 does not have, or have access to, trusted digests 420, which are stored at persistent memory 418 of secure device 410. In the example shown in FIG. 4, native boot code 438 is configured to obtain digest 446 from MCU application 434, generate signature 448 from MCU app signature 436, and send digest 446 and signature 448 to trusted sequence circuitry 416 by way of debug function circuitry 442 as sent messages 422, however it does not verify digest 446 or signature 448 is secure.

In an alternative embodiment, trusted sequence circuitry 416 may be configured to read digest 446 and signature 448 from a location at program memory 432 or another memory where it was stored by native boot code 438 by way of debug function circuitry 442. In other words, in some embodiments it is contemplated that native boot code 438 may be configured to send digest 446 and/or signature 448 to secure device 410, and in some embodiments it is contemplated that trusted sequence circuitry 416 may be configured to use debug function circuitry 442 to retrieve digest 446 and/or signature 448 from MCU 430. For example, trusted sequence circuitry 416 may insert breakpoints into native boot code 438 using debug function circuitry 442, halt execution of native boot code 438 once digest 446 and/or signature 448 are calculated, and retrieve the calculated values.

In one or more embodiments, trusted sequence circuitry 416 may be configured to assert reset 444 of MCU 430 via reset signal 424 (reset 444 being configured to cause MCU 430 to be put into a restricted mode of operation), and to use debug function circuitry 442 to instruct CPU 440 to execute native boot code 438 and receive (or retrieve) digest 446 and signature 448. In one or more embodiments, trusted sequence circuitry 416 may be configured, generally, to verify MCU application 434 is secure using one or more of digest 446 and signature 448. More specifically, trusted sequence circuitry 416 may be configured to authenticate, in conjunction with cryptography unit 414, a source of MCU application 434 using signature 448, and confirm integrity of MCU application 434 using trusted digest 420.

In one or more embodiments, cryptography unit 414 may be configured, generally, to verify signature 448 using public and/or private key cryptography techniques. In the example system 400 shown in FIG. 4, secure device 410 includes public key 412, and cryptography unit 414 uses public key 412 to decode signature 448. Trusted sequence circuitry 416 may verify the identity of a source of MCU application 434 responsive to the decoded signature 448, and confirm that MCU application 434 is associated with an authorized party. Trusted sequence circuitry 416 may confirm digest 446 matches one of trusted digests 420, and in response confirm the integrity of MCU application 434.

Figure 5:
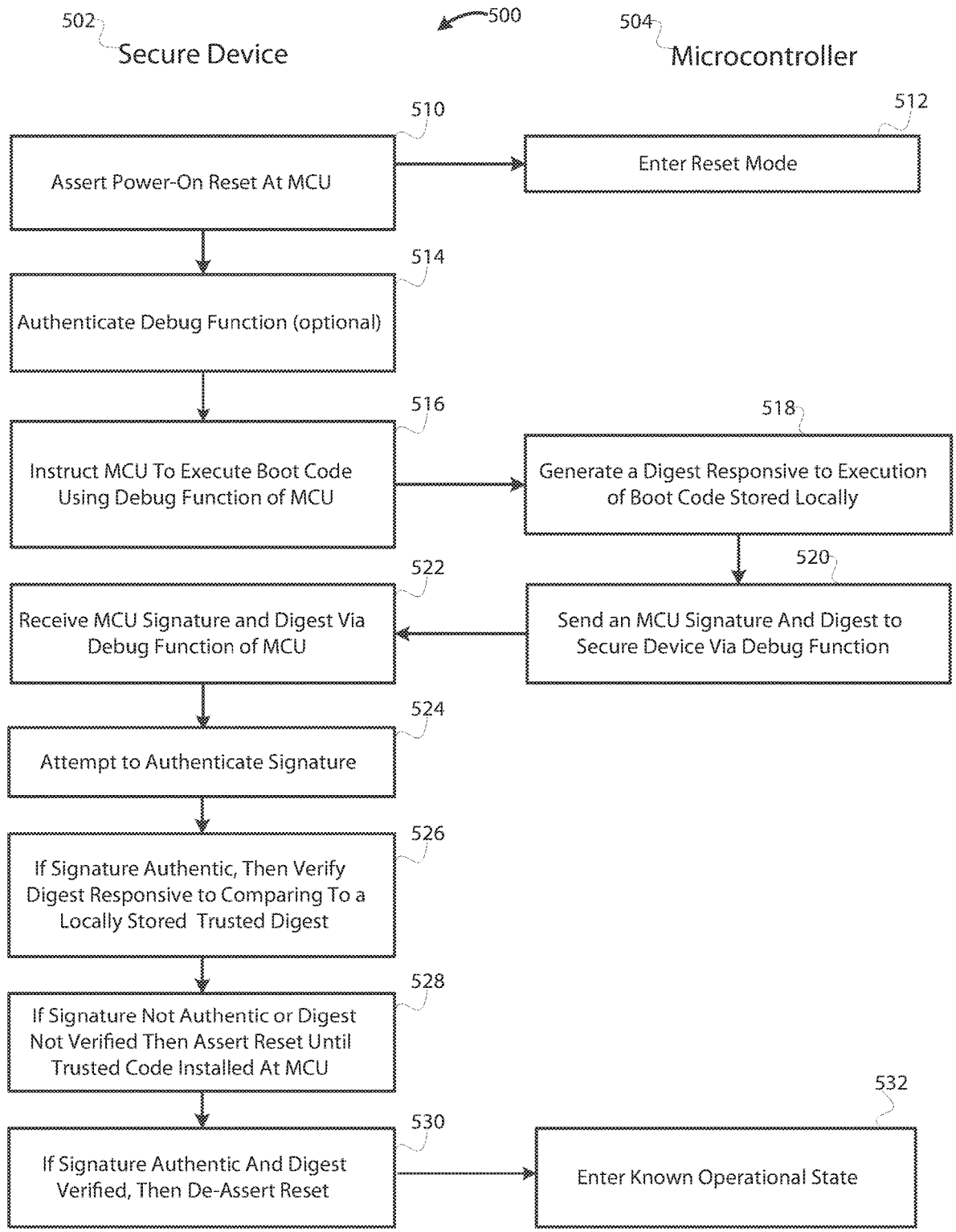
FIG. 5 is an example process for ensuing authenticity of an MCU application, in accordance with one or more embodiments of the disclosure.

FIG. 5 shows a process 500 for secure boot assist where a secure device 502 performs verification of a digest generated by a boot code at MCU 504 implementation of a host device in accordance with one or more embodiments of the disclosure.

In the example contemplated in FIG. 5, a new MCU application has already been received at MCU 504 and loaded into program memory, so while steps for connecting to a host and downloading the MCU application are not described in detail, embodiments including such steps are specifically contemplated.

In operation 510, secure device 502 asserts and holds a reset at MCU 504. In operation 512, MCU 504 enters a reset mode responsive to secure device 502 asserting the reset, and while the reset is asserted, MCU 504 is held in the reset mode and prevented from running any software on its own. In optional operation 514, a debug function (e.g., debug function circuitry 442, without limitation) of MCU 504 is authenticated, for example, using a digital signature generated using public key cryptology techniques. As with process 300 (FIG. 3), in some embodiments authenticating a debug function may be omitted. In operation 516, secure device 502 uses a debug function to instruct MCU 504 to execute a boot code stored at MCU 504. In operation 518, the boot code generates a digest and a signature from an MCU application stored at MCU 504. In one or more embodiments, the signature may be an MCU signature included with the MCU application or created by the boot code. In operation 520, MCU 504 sends the signature and digest to the secure device 502 using the debug function.

In operation 522, secure device 502 receives the signature and digest via the debug function of the MCU. In operation 524, secure device 502 attempts to authenticate the received signature. In operation 526, secure device 502 attempts to verify the received digest. In one embodiment, secure device 502 verifies the digest using a trusted digest that is locally stored (i.e., stored in a persistent memory of secure device 502). In one embodiment, secure device 502 attempts to verify the digest only after successfully authenticating the signature. If the signature is not authentic or the digest is not verified, then in operation 528, secure device 502 asserts the reset until it detects that trusted code has been installed at MCU 504. If the signature is authentic and the digest is verified then in operation 530 secure device 502 stops asserting the reset, and in operation 532, MCU 504 enters a known operational state from which it may execute the new MCU application, which has now been verified.

Figure 6:
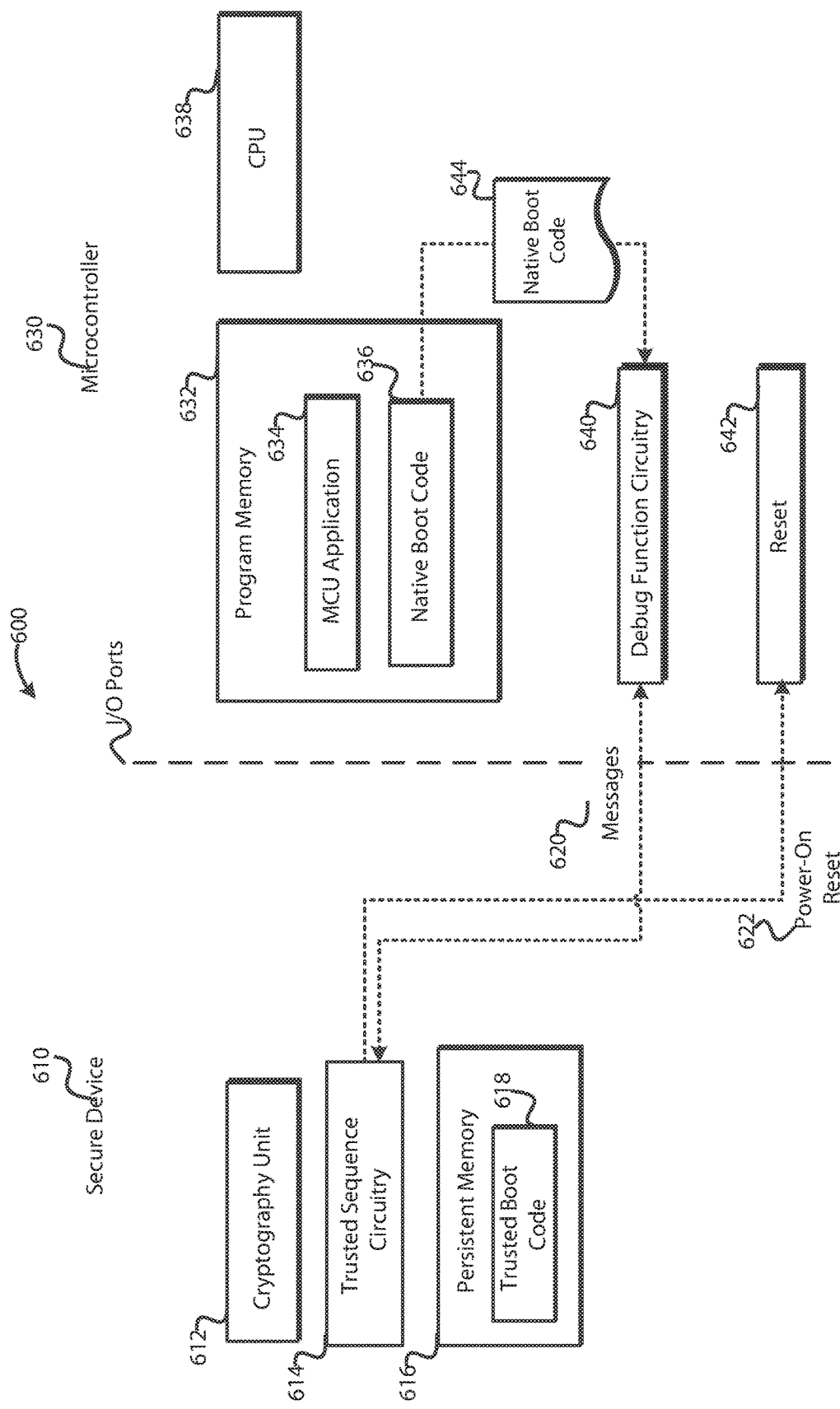
FIG. 6 is a simplified block diagram of a system for ensuring authenticity of an MCU application, in accordance with one or more embodiments of the disclosure.

FIG. 6 shows a simplified block diagram of an example system 600 for assisting with a secure boot process at a host device of a computing system, implemented here as MCU 630, in accordance with one or more embodiments of the disclosure. In embodiments shown in FIG. 6, a native boot code 636 stored in program memory 632 at MCU 630 is configured to verify MCU application 634 is secure, however, since native boot code 636 may be compromised in some way, secure device 610 is configured to verify native boot code 636 is secure using trusted boot code 618 stored in persistent memory 616 of secure device 610. In one or more embodiments, trusted sequence circuitry 614 is configured to assert a reset signal 622 to reset 642, and reset 642 is configured to respond by putting MCU 630 in a restricted mode of operation, and retrieve a copy 644 of native boot code 636 using debug function circuitry 640, for example using send and receive messages 620. Trusted sequence circuitry 614 is configured to determine if retrieved copy 644 of boot code 636 matches trusted boot code 618. If retrieved copy 644 of native boot code 636 matches trusted boot code 618, then boot code 636 is successfully verified and trusted sequence circuitry 614 determines that boot code 636 is secure.

In the example system 600 shown in FIG. 6, trusted boot code 618 is stored in persistent memory 616 of secure device 610, but other security information may be used to verify native boot code 636 in addition to, or as an alternative to, trusted boot code 618. In one embodiment, trusted security data such as a trusted digital signature, a trusted digest, or a trusted MAC code may be stored at persistent memory 616.

As described in this disclosure, in some cases there may be a risk that debug function circuitry such as debug function circuitry 640 is compromised. If compromised, debug function circuitry 640 may modify copy 644 of native boot code 636 before it is sent to secure device 610 in order to obscure differences between native boot code 636 and trusted boot code 618. So, in one or more embodiments, trusted sequence circuitry 614, in conjunction with cryptography unit 612, may attempt to authenticate debug function circuitry 640, for example using various public and/or private key encryption techniques, and only attempts to verify native boot code 636 responsive to successfully authenticating debug function circuitry 640. By way of example, trusted sequence circuitry 614 may request and receive (e.g., using messages 620, without limitation) a signature from debug function circuitry 640, and authenticate the received signature using a public key.

Upon successfully verifying native boot code 636, trusted sequence circuitry 614 may be configured to use debug function circuitry 640 to instruct CPU 638 to execute boot code 636 upon exiting a restricted mode, and then stop asserting power on reset signal 622 at reset 642. CPU 638 executes native boot code 636 upon de-assertion of reset signal 622 to reset 642, and native boot code 636 attempts to verify that MCU application 634 is secure.

Figure 7:
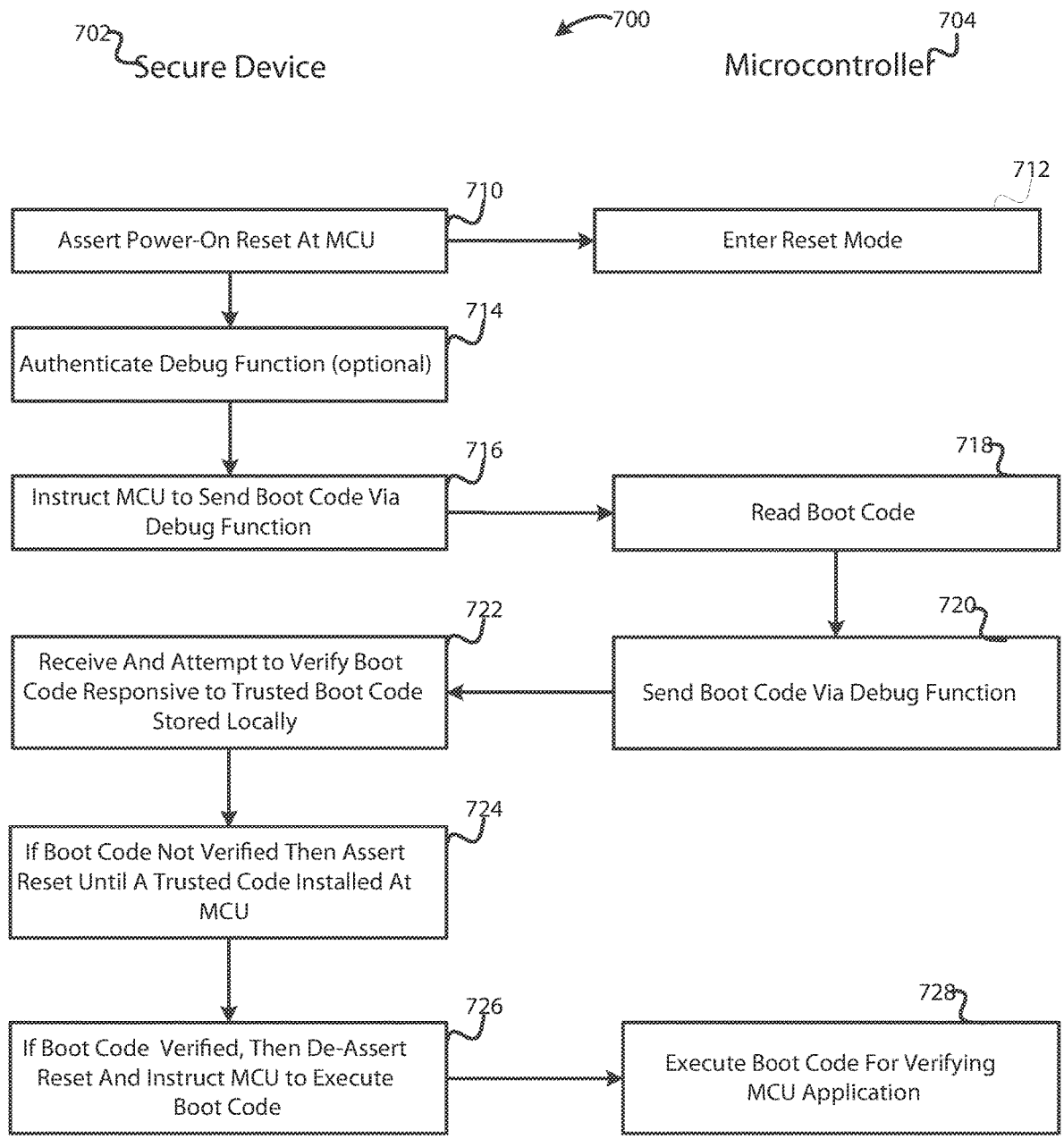
FIG. 7 is an example process for ensuing authenticity of an MCU application, in accordance with one or more embodiments of the disclosure.

FIG. 7 shows a process 700 for secure boot assist where a secure device 702 performs verification of boot code of a host device, implemented as MCU 704, in accordance with one or more embodiments of the disclosure.

In the contemplated example, a new MCU application has already been received at MCU 704 and loaded into program memory, so while steps for connecting to a source of new firmware and downloading the MCU application are not described in detail they are specifically contemplated.

In operation 710, secure device 702 asserts and holds a reset at MCU 704. In operation 712, MCU 704 enters a reset mode responsive to secure device 702 asserting the reset, and while the reset is asserted, MCU 704 is held in the reset mode and prevented from running any software on its own. In optional operation 714, a debug function of MCU 704 is authenticated, for example, using a digital signature generated using public key cryptology techniques. As with process 300 (FIG. 3) and process 500 (FIG. 5), in some embodiments authenticating a debug function may be omitted. In operation 716, secure device 702 uses a debug function to instruct MCU 704 to send a copy of boot code cored stored at MCU 704 to secure device 702. In operation 718, MCU 704 reads native boot code and in operation 720 sends a copy of the native boot code to secure device 702 via the debug function. In operation 722, secure device 702 receives the copy of boot code via the debug function and attempts to verify the native boot code of the MCU 704 responsive to the copy of the native boot code and a trusted boot code stored locally at secure device 702. In one or more embodiments, the copy of the boot code and trusted boot code may be compared using any suitable technique, including, but not limited to, bit by bit comparison or using hashes. If the boot code is not successfully verified then in operation 724 the secure device 702 continues to hold the MCU 704 in reset until it detects that trusted boot code has been installed at the MCU 704. If the native boot code of the MCU is successfully verified in operation 722 then, in operation 726, secure device 702 instructs MCU 704 to execute the native boot code upon exiting the reset mode, and de-asserts the reset at the MCU 704. In operation 728, the boot code executes at MCU 704 upon exiting the reset mode and attempts to verify that an MCU application is secure.

In one or more embodiments, a computing system may be configured to operate responsive to a number of modes of operation. A first mode may correspond to embodiments described with reference to FIGS. 2 and 3, a second mode may correspond to embodiments described with reference to FIGS. 4 and 5, and a third mode may correspond to embodiments described with reference to FIGS. 6 and 7. In other words, a secure boot assist system may be configured to perform secure boot assist using a low-level boot code provided from a secure device according to a first mode operation, perform secure boot assist using a trusted digest generated by a native boot code according to a second mode of operation, and perform secure boot assist using verified native boot code according to a third mode of operation.

Such a system may be configured to operating according to the first, second, or third mode of operation responsive to a detected mode setting. In some embodiments, a mode of a system may be set based, at least in part, on a context, and more specifically, potential damage from security breaches given a specific context. In other words, a more restricted mode operation may be used for high risk contexts, and a less restricted mode of operation may be used for low risk contexts.

By way of example, a boot assist circuitry used in a medical device or autonomous vehicle controller may be configured to perform secure boot assist using a trusted digest if firmware is being upgraded at an authorized service location or using authorized service equipment at a mechanic shop or medical provider's office. Such boot assist circuitry may be configured to perform secure boot assist using a low-level boot code and require authentication of debug function circuitry if firmware is being upgraded at a location other than an authorized service location or using unauthorized service equipment, for example using an unsecure personal computer.

One or more embodiments of the disclosure relate to a contemplated "secure" implementation, where a computing system such as computing system 100 of FIG. 1 comprises a secure device stacked on a host device, for example, using a module or system-in-package (SiP) arrangement. When stacked, the trusted device and the host device may be arranged relative to each other such that software debug pins and/or hardware reset pins of the host device are hidden, that is, accessible by the secure device but not accessible external to the module.

One of ordinary skill in the art will appreciate many advantages and benefits of the various embodiments described in this disclosure. For example, one or more benefits and advantages may include: strong isolation between boot code and the application code of an MCU; no software methods of attack beyond that which would have been available with a boot ROM itself; expedited availability of modules/SiP solutions across a wide range of MCU capabilities without requiring new mask sets and associated development times for each; improving secure boot capabilities of MCU's with existing secure boot capability without requiring new mask sets and associated development time; adding capability to properly verify an asymmetric signature in a timely matter at an MCU that already had a boot ROM.

Any characterization in this disclosure of something as "typical," "conventional," or "known" does not necessarily mean that it is disclosed in the prior art or that the discussed aspects are appreciated in the prior art. Nor does it necessarily mean that, in the relevant field, it is widely known, well-understood, or routinely used.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

Additional non-limiting embodiments of the disclosure include:

Embodiment 1

A method of assisting a device with performing a secure boot process, the method comprising: placing and holding a device in a restricted mode of operation; sending a program to the device using an interface for controlling a central processing unit (CPU) of the device; initiating execution of the program at the device using the interface for controlling the CPU; and attempting to verify security of firmware stored at the device responsive to the initiated execution of the program.

Embodiment 2

The method of Embodiment 1, wherein the sending the program to the device comprises sending a low level boot code to the device.

Embodiment 3

The method of Embodiments 1 and 2, wherein the placing and holding the device in the restricted mode of operation comprises disabling independent initiation of execution of code at the device responsive to detecting that new firmware has been received at the device.

Embodiment 4

The method of Embodiments 1 through 3, wherein the attempting to verify security of the firmware stored at the device responsive to the initiated execution of the program comprises: performing a hashing function on operating code stored at a program memory of the device to obtain security data; comparing the obtained security data to trusted security data; and attempting to verify the operating code is secure responsive to the comparing of the obtained security data to the trusted security data.

Embodiment 5

The method of Embodiments 1 through 4, further comprising verifying the operating code is secure responsive to detecting that the obtained security data matches the trusted security data.

Embodiment 6

The method of Embodiments 1 through 5, further comprising determining the operating code is unsecure responsive to detecting that the obtained security data does not match the trusted security data.

Embodiment 7

The method of Embodiments 1 through 6, further comprising holding the device in the restricted mode of operation until the program detects that secure operating code is installed at the device.

Embodiment 8

The method of Embodiments 1 through 7, further comprising restarting the device until the program detects that secure operating code is installed at the device.

Embodiment 9

The method of Embodiments 1 through 8, wherein the initiating execution of the program at the device using the interface for controlling the CPU, comprises: instructing the device to execute the program upon the device exiting the restricted mode of operation; and releasing the device from the restricted mode of operation.

Embodiment 10

The method of Embodiments 1 through 9, further comprising: receiving a first verification result responsive to verifying that the firmware is secure; and receiving a second verification result responsive to determining that the firmware is not secure.

Embodiment 11

The method of Embodiments 1 through 10, further comprising, responsive to receiving the first verification result: instructing the device to execute the firmware upon exiting the restricted mode of operation; and releasing the device from the restricted mode of operation.

Embodiment 12

The method of Embodiments 1 through 11, further comprising, responsive to receiving the second verification result: holding the device in the restricted mode of operation until detecting that security of the firmware stored at the device is verified.

Embodiment 13

A secure boot-assisted system, comprising: a first device comprising: a program memory configured to store firmware for the first device; a processor; and an interface for accessing and controlling the processor; a second device operatively coupled to the first device, the second device comprising: a persistent memory having stored thereon a program that, when executed by the processor of the first device, are configured to enable the processor to attempt to verify security of firmware stored at the program memory of the first device; and a trusted sequence circuitry configured to use the interface to send the program to the first device and initiate execution of the program at the first device, and wherein the trusted sequence circuitry is configured to hold the first device in a restricted mode of operation while attempting to verify security of the stored firmware for the first device.

Embodiment 14

The system of Embodiment 13, wherein the trusted sequence circuitry is configured to assert a signal at a hardware input of the first device responsive to detecting that new firmware is stored at the first device, and further wherein the first device is configured to operate in the restricted mode of operation while the hardware input is asserted.

Embodiment 15

The system of Embodiments 13 and 14, wherein the trusted sequence circuitry is configured to control the interface of the first device to prevent at least some functionality of the first device.

Embodiment 16

The system of Embodiments 13 through 15, wherein the processor of the first device is configured to execute responsive to control signals provided by the interface responsive to the first device being in the restricted mode of operation.

Embodiment 17

The system of Embodiments 13 through 16, wherein the trusted sequence circuitry of the second device is configured, responsive to storing the program at the first device, to: use the interface to instruct the first device to initiate execution of the program upon exiting the restricted mode of operation; and release the first device from the restricted mode of operation.

Embodiment 18

The system of Embodiments 13 through 17, wherein the firmware comprises operating code, and the program, when executed by the processor, are configured to enable the processor to: hash the operating code stored in the program memory of the first device to obtain a first digest; compare the first digest to a second digest; and attempt to verify the operating code is secure responsive to the comparison of the first digest and the second digest.

Embodiment 19

The system of Embodiments 13 through 18, wherein the program, when executed by the processor, are configured to: determine the operating code is secure responsive to detecting that the first digest matches the second digest; and determine the operating code is not secure responsive to detecting that the first digest does not match the second digest.

Embodiment 20

The system of Embodiments 13 through 19, wherein the trusted sequence circuitry of the second device is configured, responsive to installing the program at the second device, to use the interface to instruct the first device to initiate execution of the program.

Embodiment 21

The system of Embodiments 13 through 20, wherein the program, when executed by the processor, is configured to:

provide a first verification result responsive to verifying that the operating code is secure; and provide a second verification result responsive to determining that the operating code is not secure.

Embodiment 22

The system of Embodiments 13 through 21, wherein the firmware comprises operating code, and the trusted sequence circuitry of the second device is configured, responsive to receiving the first verification result, to: use the interface to instruct the first device to initiate execution of the operating code upon exiting the restricted mode of operation; and release the first device from the restricted mode of operation.

Embodiment 23

The system of Embodiments 13 through 22, wherein the trusted sequence circuitry of the second device is configured, responsive to receiving the second verification result, to hold the first device in the restricted mode of operation until detecting that secure firmware is installed at the first device.

Embodiment 24

The system of Embodiments 13 through 23, wherein the firmware comprises code for one or more of: an integrated embedded system, an operating system, an operating system loader, and individually installed applications.

Embodiment 25

A method of assisting a device with performing a secure boot process, comprising: placing and holding a device in a restricted mode of operation; copying, to another device, code stored at a program memory of the device using an interface for controlling a central processing (CPU) of the device; and attempting to verify the copied code is secure.

Embodiment 26

The method of Embodiment 25, wherein the placing and holding the device in the restricted mode of operation comprises disabling independent initiation of execution of code at the device.

Embodiment 27

The method of Embodiments 25 and 26, wherein the attempting to verify the copied code is secure comprises: performing a hashing function on the copied code to obtain a first security data; and attempting to verify the copied code is secure responsive to the first security data.

Embodiment 28

The method of Embodiments 25 through 27, wherein the attempting to verify the copied code is secure responsive to the first security data comprises: comparing the first security data to second security data stored at the other device; and attempting to verify the copied code responsive the comparing.

Embodiment 29

The method of Embodiments 25 through 28, wherein the attempting to verify the copied code is secure responsive to the first security data comprises attempting to verify the copied code by performing signature validation on the first security data.

Embodiment 30

The method of Embodiments 25 through 29, further comprising: verifying the copied code is secure; instructing the device to execute code corresponding to the copied code upon exiting the restricted mode of operation; and releasing the device from the restricted mode of operation.

Embodiment 31

The method of Embodiments 25 through 30, further comprising: determining the copied code is unsecure responsive; and holding the device in the restricted mode of operation until verifying that code installed at the device is secure.

Embodiment 32

The method of Embodiments 25 through 31, wherein the copying code stored at the program memory of the device comprises copying boot code stored at the program memory of the device.

Embodiment 33

The method of Embodiments 25 through 32, wherein the copying code stored at the program memory of the device comprises: copying a portion of operating code stored at the program memory of the device, wherein the device is configured to execute the copied portion of the operating code upon a boot-up of the device or upon a reset condition of the device.

Embodiment 34

A secure boot-assisted system, comprising: a first device comprising: a program memory configured to store code for firmware of the first device; a processor; and an interface for accessing and controlling the processor; a second device operatively coupled to the first device, the second device comprising: a persistent memory having stored thereon security information for verifying security of the code stored at the first device; and a trusted sequence circuitry configured to use the debug-function circuitry to copy the code from the first device and attempt to verify the copied code is secure using the security information, wherein the trusted sequence circuitry is configured to hold the first device in a restricted mode of operation while attempting to verify the copied code is secure.

Embodiment 35

The system of Embodiment 34, wherein the trusted sequence circuitry is configured to assert a hardware input of the first device responsive to detecting that new firmware is installed at the first device, and further wherein the first device is configured to operate in the restricted mode of operation while the hardware input is asserted.

Embodiment 36

The system of Embodiments 34 and 35, wherein the trusted sequence circuitry is configured to control the interface of the first device to prevent at least some functionality of the first device.

Embodiment 37

The system of Embodiments 34 through 36, wherein the processor of the first device is configured to execute responsive to control signals provided by the interface responsive to the first device being in the restricted mode of operation.

Embodiment 38

The system of Embodiments 34 through 37, wherein the security information comprises trusted security data, and the trusted sequence circuitry is configured to: perform a hashing function on the copied code to obtain a first security data; and attempt to verify the copied code is secure responsive to the obtained security data and the trusted security data.

Embodiment 39

The system of Embodiments 34 through 38, wherein the security information comprises trusted code, and the trusted sequence circuitry of the second device is configured to: perform a hashing function on the copied code to obtain a first security data; perform the hashing function on the trusted code to obtain a second security data; compare the first security data to the second security data; and attempt to verify the copied code is secure responsive to the comparing the first security data to the second security data.

Embodiment 40

The system of Embodiments 34 through 39, wherein the trusted sequence circuitry of the second device is configured, responsive to verifying the copied code is secure, to: use the interface to instruct the first device to execute code corresponding to the copied code upon exiting the restricted mode of operation; and release the first device from the restricted mode of operation.

Embodiment 41

The system of Embodiments 34 through 40, wherein the trusted sequence circuitry of the second device is configured, responsive to determining that the copied code is not secure, to hold the first device in the restricted mode of operation until detecting that secure code is installed at the first device.

Embodiment 42

The system of Embodiments 34 through 41, wherein the security information comprises trusted code, and the trusted sequence circuitry of the second device is configured to compare the copied code to the trusted code and attempt to verify the copied code is secure responsive to the comparison.

Embodiment 43

A method of assisting a device with performing a secure boot process, comprising: placing and holding a device in a restricted mode of operation; initiating execution of native boot code stored at the device using an interface for controlling a central-processing-unit (CPU) of the device; receiving security data using the interface for controlling the CPU of the device responsive to the initiating execution of the native boot code, wherein the received security data is representative of firmware of the device; and attempting to verify the firmware of the device is secure responsive to the received security data and a trusted security data stored external to the device.

Embodiment 44

The method of Embodiment 43, further comprising: performing a hashing function on code of the firmware of the device to obtain the security data; and sending the obtained security data to another device for verification that the firmware of the device is secure.

Embodiment 45

The method of Embodiments 43 and 44, further comprising: verifying the firmware of the device is secure responsive to detecting that the received security data matches the trusted security data; instructing the device to execute the native boot code upon exiting the restricted mode of operation; and releasing the device from the restricted mode of operation.

Embodiment 46

The method of Embodiments 43 through 45, further comprising: determining the firmware is unsecure responsive to detecting that the received security data does not match the trusted security data; and holding the device in the restricted mode of operation until detecting that secure firmware is installed at the device.

Embodiment 47

A secure boot-assisted system, comprising: a first device comprising: a program memory configured to store code for the first device; a processor; and an interface for accessing and controlling the processor; a second device operatively coupled to the first device, the second device comprising: a persistent memory having stored thereon trusted security data for verifying security of code stored at the first device; and a trusted sequence circuitry configured to: initiate execution of a native boot code stored at the first device using the interface; receive security data using the interface for controlling the CPU of the device responsive to the initiating execution of the native boot code, wherein the received security data is representative of firmware of the first device; and attempt to verify the firmware of the device is secure using the received security data and the trusted security data, wherein the trusted sequence circuitry is configured to hold the first device in a restricted mode of operation while attempting to verify the firmware is secure.

Embodiment 48

The system of Embodiment 47, wherein the trusted sequence circuitry is configured to assert a hardware input of the first device responsive to detecting that new firmware is installed at the first device, and further wherein the first device is configured to operate in the restricted mode of operation while the hardware input is asserted.

Embodiment 49

The system of Embodiments 47 and 48, wherein the trusted sequence circuitry is configured to control the interface of the first device to prevent at least some functionality of the first device.

Embodiment 50

The system of Embodiments 47 through 49, wherein the processor is configured to execute responsive to control signals provided by the interface responsive to the first device being in the restricted mode of operation.

Embodiment 51

The system of Embodiments 47 through 50, wherein the native boot code, when executed by the processor, is configured to: perform a hashing function on code of the firmware of the first device to obtain the security data; and sending the obtained security data to the second device for verification that the firmware of the first device is secure.

Embodiment 52

The system of Embodiments 47 through 51, wherein the trusted sequence circuitry is configured, responsive to verifying the firmware of the first device is secure, to: instruct the first device to execute operating code of the first device upon exiting the restricted mode of operation; and release the first device from the restricted mode of operation.

Embodiment 53

The system of Embodiments 47 through 52, wherein the trusted sequence circuitry is configured, responsive to determining that the firmware of the first device is not secure, to hold the first device in the restricted mode of operation until detecting that secure firmware is installed at the first device.

We claim:

1. A method, the method comprising:
    disabling independent initiation of execution of code at a device to place the device in a restricted mode of operation;
    while holding the device in the restricted mode of operation:
        sending a program to the device via an interface enabled to control a central processing unit (CPU) of the device; and
        initiating execution of the program at the device via the interface enabled to control the CPU; and
    verifying security of firmware stored at the device responsive to the initiated execution of the program.

2. The method of claim 1, wherein the sending the program to the device comprises sending a low level boot code to the device.

3. The method of claim 1, wherein the disabling independent initiation of execution of code at the device is responsive to detecting that new firmware has been received at the device.

4. The method of claim 1, wherein the verifying security of the firmware stored at the device responsive to the initiated execution of the program comprises:
    performing a hashing function on operating code stored at a program memory of the device to obtain security data;
    comparing the obtained security data to trusted security data; and
    verifying the operating code is secure responsive to the comparing of the obtained security data to the trusted security data.

5. The method of claim 4, further comprising verifying the operating code is secure responsive to detecting that the obtained security data matches the trusted security data.

6. The method of claim 4, further comprising determining the operating code is unsecure responsive to detecting that the obtained security data does not match the trusted security data.

7. The method of claim 6, further comprising holding the device in the restricted mode of operation until the program detects that secure operating code is installed at the device.

8. The method of claim 6, further comprising restarting the device until the program detects that secure operating code is installed at the device.

9. The method of claim 1, further comprising:
    receiving a first verification result responsive to verifying that the firmware is secure; and
    receiving a second verification result responsive to determining that the firmware is not secure.

10. The method of claim 9, further comprising, responsive to receiving the first verification result:
    instructing the device to execute the firmware upon exiting the restricted mode of operation; and
    releasing the device from the restricted mode of operation.

11. The method of claim 9, further comprising, responsive to receiving the second verification result:
    holding the device in the restricted mode of operation until detecting that security of the firmware stored at the device is verified.

12. A secure boot-assisted system, comprising:
    a first device comprising:
        a memory having firmware stored thereon;
        a processor; and
        an interface for accessing and controlling the processor;
    a second device operatively coupled to the first device, the second device comprising:
        a persistent memory having stored thereon a program that, when executed by the processor of the first device, is configured to cause the processor to verify security of firmware stored at the program memory of the first device; and
        a trusted sequence circuitry, comprising a logic circuit configured to use the interface to send the program to the first device and initiate execution of the program at the first device, and
        wherein the logic circuit of the trusted sequence circuitry is configured to hold the first device in a restricted mode of operation while the processor verifies security of the stored firmware for the first device, and wherein the logic circuit of the trusted sequence circuitry is configured to control the interface of the first device to prevent at least some functionality of the first device.

13. The system of claim 12, wherein the logic circuit of the trusted sequence circuitry is configured to assert a signal at a hardware input of the first device responsive to detecting that new firmware is stored at the first device.

14. The system of claim 13, wherein the processor of the first device is configured to execute the program responsive to control signals provided by the interface.

15. The system of claim 12, wherein the firmware comprises operating code, and wherein the program, when executed by the processor, is configured to cause the processor to:
    hash the operating code stored in the memory of the first device to obtain a first digest;
    compare the first digest to a second digest; and
    verify the operating code is secure responsive to a comparison of the first digest and the second digest.

16. The system of claim 15, wherein the program, when executed by the processor, is configured to cause the processor to:
  determine the operating code is secure responsive to detecting that the first digest matches the second digest; and
  determine the operating code is not secure responsive to detecting that the first digest does not match the second digest.

17. The system of claim 12, wherein the logic circuit of the trusted sequence circuitry of the second device is configured, responsive to installing the program at the first device, to use the interface to instruct the first device to initiate execution of the program.

18. The system of claim 17, wherein the program, when executed by the processor, is configured to cause the processor to:
  provide a first verification result responsive to verifying that an operating code is secure; and
  provide a second verification result responsive to determining that the operating code is not secure.

19. The system of claim 18, wherein the firmware comprises operating code, and the logic circuit of the trusted sequence circuitry of the second device is configured, responsive to receiving the first verification result, to:
  use the interface to instruct the first device to initiate execution of the operating code upon exiting the restricted mode of operation; and
  release the first device from the restricted mode of operation.

20. The system of claim 18, wherein the logic circuit of the trusted sequence circuitry of the second device is configured, responsive to receiving the second verification result, to hold the first device in the restricted mode of operation until detecting that secure firmware is installed at the first device.

21. The system of claim 12, wherein the firmware comprises operating code for one or more of: an integrated embedded system, an operating system, an operating system loader, or individually installed applications.

* * * * *